(12) United States Patent
Ohara

(10) Patent No.: US 9,803,159 B2
(45) Date of Patent: Oct. 31, 2017

(54) METHOD OF MAKING OIL-AND-FAT

(75) Inventor: Atsushi Ohara, Tokyo (JP)

(73) Assignee: THE NISSHIN OILLIO GROUP, LTD., Tokyo (JP)

( * ) Notice: Subject to any disclaimer, the term of this patent is extended or adjusted under 35 U.S.C. 154(b) by 626 days.

(21) Appl. No.: 13/388,283

(22) PCT Filed: Aug. 6, 2010

(86) PCT No.: PCT/JP2010/063399
§ 371 (c)(1),
(2), (4) Date: Jan. 31, 2012

(87) PCT Pub. No.: WO2011/040120
PCT Pub. Date: Apr. 7, 2011

(65) Prior Publication Data
US 2012/0128859 A1    May 24, 2012

(30) Foreign Application Priority Data

Sep. 30, 2009   (JP) ................. 2009-227984

(51) Int. Cl.
| | | |
|---|---|---|
| *A23D 7/02* | (2006.01) | |
| *C11C 3/12* | (2006.01) | |
| *C11B 7/00* | (2006.01) | |
| *A23G 1/38* | (2006.01) | |
| *C11C 3/10* | (2006.01) | |

(52) U.S. Cl.
CPC ............ *C11C 3/12* (2013.01); *A23G 1/38* (2013.01); *C11B 7/00* (2013.01); *C11B 7/0075* (2013.01); *C11C 3/10* (2013.01)

(58) Field of Classification Search
CPC .... A23G 1/38; C11C 3/10; C11C 3/12; C11B 7/0075; C11B 7/00
USPC ........................................ 426/601, 606, 607
See application file for complete search history.

(56) References Cited

U.S. PATENT DOCUMENTS

| | | | | |
|---|---|---|---|---|
| 4,702,928 | A | * 10/1987 | Wieske et al. | ................ 426/607 |
| 5,879,736 | A | 3/1999 | Fujinaka et al. | |
| 2005/0163909 | A1 * | 7/2005 | Cleenewerck | ......... A21D 2/165 |
| | | | | 426/601 |
| 2006/0165867 | A1 * | 7/2006 | Kuwabara et al. | .......... 426/601 |
| 2007/0269468 | A1 * | 11/2007 | Bach et al. | ................... 424/401 |

FOREIGN PATENT DOCUMENTS

| | | | | |
|---|---|---|---|---|
| EP | 0688505 | * 12/1995 | ............ | A23D 7/001 |
| JP | 02092997 | * 4/1990 | | |
| JP | 9-285255 A | 11/1997 | | |
| JP | 9-316484 A | 12/1997 | | |
| JP | WO 2005094598 | * 10/2005 | | |
| JP | 2008-289404 A | 12/2008 | | |
| WO | WO 2005/094598 A1 | 10/2005 | | |

OTHER PUBLICATIONS

Hidaka et al., JP02092997 (Derwent Abstract).*
English Translation of Asama et al., WO 2005094598.*
Kellens, et al., Palm oil fractionation, Eur. J. Lipid Sci. Technol., 2007, 109 (4), p. 336-349.
International Search Report (ISR) (PCT Form PCT/ISA/210) dated Aug. 30, 2010, in PCT/JP2010/063399.

* cited by examiner

*Primary Examiner* — Felicia Turner
(74) *Attorney, Agent, or Firm* — McGinn IP Law Group, PLLC

(57)   ABSTRACT

A method of making an oil-and-fat capable of being used as a non-tempering hard butter of a non-lauric acid type, having a sharp melting property (meltability in the mouth), a good compatibility with a cacao butter and a low trans-fatty acid content, includes fractionating an oil-and-fat A comprising a first non-laurin-based oil-and-fat containing 50 to 100 mass % of SUS type triglyceride and a non-laurin-based transesterification oil containing 12 to 38 mass % of SSU type triglyceride or an oil-and-fat B obtained by partially hydrogenating the oil-and-fat A so as to obtain a soft portion.

20 Claims, No Drawings

METHOD OF MAKING OIL-AND-FAT

TECHNICAL FIELD

This invention relates to a method of making an oil-and-fat, in particular, to a method of making an oil-and-fat that is capable of being used as a non-tempering hard butter.

BACKGROUND ART

Hard butter used in substitution for cacao butter is generally classified into a tempering hard butter and a non-tempering hard butter.

The tempering hard butter is made from similar fats having a structure of symmetrical triglyceride closely resembling the cacao butter so that it can be easily blended with the cacao butter and is called CBE (cacao butter equivalent).

On the other hand, the non-tempering hard butter resembles the cacao butter in melting property, but extremely differs in a structure of oil-and-fat and is roughly classified into a lauric acid type and a non-lauric acid type. Both of the lauric acid and non-lauric acid types have a low compatibility with the cacao butter, but are lower in price than the cacao butter and have a good workability since a complicated tempering work is not needed so that those are widely used in confectionery and bakery industries.

Of the non-tempering hard butter, a lauric acid type hard butter is known, the hard butter typically being obtained by hydrogenating and extremely hardening a hard portion obtained by fractionating a palm kernel oil. This kind of hard butter has an extremely sharp melting property, but the blend ratio of cacao butter should be decreased as much as possible since it has an extremely bad compatibility with the cacao butter so that chocolates using this become poor in cacao flavor. Further, there is a disadvantage that the hard butter comprises not less than 50 mass % of a lauric acid as the constituent fatty acid so that it becomes extremely poor in the flavor when being hydrolyzed in a poor state of preservation.

Of the non-tempering hard butter, a non-lauric acid type hard butter is also called a trans-acid type hard butter, and the following hard butter is known, the hard butter typically being obtained by isomerizing-hydrogenating a liquid oil such as a palm olein having a low melting point or a soybean oil, and the hard butter being a hard portion or a medium-melting portion obtained by that the isomerized-hydrogenated one is further fractionated as necessary. Although the non-lauric acid type hard butter has a melting property lacking in sharpness in comparison with the lauric acid type hard butter, it has a better compatibility with the cacao butter than the lauric acid type hard butter so that it can be blended relatively more than the lauric acid type hard butter. However, the non-lauric acid type hard butter comprises a good deal of trans-fatty acid so that it has been kept away from being used since it was recognized that the trans-fatty acid harms health.

Therefore, the development of a non-lauric acid type non-tempering hard butter is required, the hard butter having a sharp melting property (meltability in the mouth), a good compatibility with the cacao butter, and a low trans-fatty acid content.

As the non-lauric acid type hard butter having a low trans-fatty acid content, for example, a hard butter is known, which contains a mixture of a slightly-hydrogenated oil of an oil-and-fat being rich in SUS type triglyceride and an oil-and-fat being rich in SSU type triglyceride (refer to Patent Literature 1).

Further, as the non-lauric acid type non-tempering hard butter containing no trans-fatty acid, a hard butter mixed with a palm medium-melting part and a fractionated medium-melting part of a transesterification oil of a palm stearin (refer to Patent Literature 2) and a non-tempering hard butter including SOS type triglyceride and SSO type triglyceride in a predetermined range where solid fat index and St/P are set to a predetermined range (refer to Patent Literature 3) are known.

PRIOR ART DOCUMENTS

Patent Literature

Patent Literature 1: International Publication WO 2005-094598
Patent Literature 2: JP-A-1997 (H09)-285255
Patent Literature 3: JP-A-1997 (H09)-316484

SUMMARY OF THE INVENTION

Problems to be Solved by the Invention

However, in order to obtain the hard butters described in the above-mentioned references, an oil-and-fat rich in SSU type triglyceride has to be obtained by passing through a complex process where a transesterification and a solvent fractionation are combined, consequently, it is not advantageous in terms of industrialization.

Therefore, it is one object of the invention to provide a method of making an oil-and-fat that is capable of being used as a non-tempering hard butter of a non-lauric acid type, having a sharp melting property (meltability in the mouth), a good compatibility with a cacao butter and a low trans-fatty acid content. Further, it is another object of the invention to provide a method of making an oil-and-fat that is advantageous in terms of industrialization.

Here, the low trans-fatty acid content means that a trans-fatty acid content is not more than 22 mass % and preferably the trans-fatty acid content is not more than 15 mass %. And, the non-lauric acid type means that a lauric acid content is less than 5 mass % and preferably the lauric acid content is less than 2 mass %.

Means for Solving the Problems

The present invention is a method of making an oil-and-fat includes fractionating an oil-and-fat A comprising a first non-laurin-based oil-and-fat containing 50 to 100 mass % of SUS type triglyceride and a non-laurin-based transesterification oil containing 12 to 38 mass % of SSU type triglyceride or an oil-and-fat B obtained by partially hydrogenating the oil-and-fat A so as to obtain a soft portion.

Advantages of the Invention

According to the invention, an oil-and-fat that is capable of being used as a non-tempering hard butter of a non-lauric acid type, having a sharp melting property (meltability in the mouth), a good compatibility with a cacao butter and a low trans-fatty acid content, and a method of making the oil-and-fat can be provided. And, according to the invention, a method of making the oil-and-fat composition that is advantageous in terms of industrialization can be also provided.

EMBODIMENT FOR CARRYING OUT THE INVENTION (Method of making oil-and-fat according to embodiment of the Invention)

A method of making an oil-and-fat according to an embodiment of the invention includes fractionating an oil-and-fat A comprising a first non-laurin-based oil-and-fat containing 50 to 100 mass % of SUS type triglyceride and a non-laurin-based transesterification oil containing 12 to 38 mass % of SSU type triglyceride or an oil-and-fat B obtained by partially hydrogenating the oil-and-fat A so as to obtain a soft portion. Here, S is saturated fatty acids having carbon atom of not less than 16 and U is unsaturated fatty acids having carbon atom of not less than 16. S and U preferably have the carbon atom of 16 to 22 and more preferably have the carbon atom of 16 to 18.

(Oil-and-fat A and Oil-and-fat B)

An oil-and-fat A and an oil-and-fat B to be provided to a fractionation process in the embodiment of the invention preferably contains 25 to 70 mass % of SUS type triglyceride (1,3-saturated-2-unsaturated triglyceride), 2 to 20 mass % of SSU type triglyceride (1,2-disaturated-3-unsaturated triglyceride and 2,3-disaturated-1-unsaturated triglyceride), 40 to 85 mass % of a total of SUS type triglyceride and SSU type triglyceride, and 4 to 30 mass % of SSS type triglyceride (trisaturated triglyceride).

The oil-and-fat A and the oil-and-fat B have a SUS type triglyceride content of more preferably 30 to 66 mass %, and furthermore preferably 35 to 62 mass %. A SSU type triglyceride content is more preferably 4 to 18 mass %, and furthermore preferably 6 to 16 mass %. A total content of SUS type triglyceride and SSU type triglyceride is more preferably 45 to 80 mass %, and furthermore preferably 50 to 75 mass %. A SSS type triglyceride content is more preferably 6 to 28 mass %, and furthermore preferably 8 to 26 mass %.

Further, the oil-and-fat A and the oil-and-fat B have a trans-fatty acid content of preferably 2 to 20 mass %, more preferably 4 to 18 mass %, furthermore preferably 6 to 16 mass %. If the trans-fatty acid content is kept within the above-mentioned range, a fractionated soft portion having a low trans-fatty acid content and a good crystallinity can be obtained.

Further, the oil-and-fat A and the oil-and-fat B have an iodine value of preferably 10 to 60, more preferably 20 to 50, furthermore preferably 25 to 45 and the most preferably 25 to 40. If the iodine value is kept within the above-mentioned range, a fractionated soft portion having properties suitable for a molding, a coating, a filling or the like can be obtained.

Furthermore, the oil-and-fat A and the oil-and-fat B have a melting point of preferably 35 to 55 degrees C., more preferably 38 to 52 degrees C., furthermore preferably 40 to 50 degrees C. and the most preferably 42 to 48 degrees C. If the melting point is kept within the above-mentioned range, a fractionated soft portion having properties suitable for a molding, a coating, a filling or the like can be obtained.

(First Non-laurin-based Oil-and-fat)

In the preferred embodiment of the invention, the first non-laurin-based oil-and-fat has an iodine value of 20 to 55 and contains 50 to 100 mass % of SUS type triglyceride. The iodine value is preferably 25 to 50 and more preferably 30 to 45. And, a SUS type triglyceride content is preferably 55 to 95 mass % and more preferably 60 to 90 mass %.

If the iodine value and the SUS type triglyceride content of the first non-laurin-based oil-and-fat are kept within the above-mentioned range, the SUS type triglyceride content can be easily adjusted, in case of mixing the first non-laurin-based oil-and-fat with a non-laurin-based transesterification oil described below so as to obtain a fractionation oil-and-fat material (an oil-and-fat A).

In the embodiment of the invention, the first non-laurin-based oil-and-fat is not particularly limited, if it contains not less than 90 mass % (preferably not less than 95 mass %, more preferably not less than 98 mass %) of fatty acids having carbon atoms of not less than 16 of the constituent fatty acids and contains 50 to 100 mass % (preferably 55 to 95 mass %, more preferably 60 to 90 mass %) of the SUS type triglyceride, and particularly, it includes a shea butter, a mango butter, a sal butter, an illipe butter, a kokum butter and a palm oil which are used as substitutes for cacao butter, and fractions obtained by fractionating the above-mentioned oil-and-fats so as to condense the SUS type triglyceride can be also used, and further, a symmetrical triglyceride oil-and-fat obtained by introducing a saturated fatty acid to a high oleic oil-and-fat at the 1,3-positions of triglyceride by using a 1,3-specific lipase can be also used. Particularly, the first non-laurin-based oil-and-fat preferably includes a palm-based oil-and-fat such as a palm oil, a fractionated palm oil, and it is economically preferable to use a palm medium-melting fraction obtained by fractionating a palm oil so as to condense the SUS type triglyceride. In the embodiment, one or more than two selected from the oil-and-fats described above can be used either alone or in combination.

In the preferred embodiment of the invention, the first non-laurin-based oil-and-fat can be partially hydrogenated in order to reform a crystallinity of the oil-and-fat. In case of being partially hydrogenated, the first non-laurin-based oil-and-fat contains preferably 5 to 35 mass %, more preferably 10 to 30 mass % and furthermore preferably 15 to 25 mass % of trans-fatty acid.

If the trans-fatty acid content of the first non-laurin-based oil-and-fat is kept within the above-mentioned range, the trans-fatty acid content can be easily adjusted, in case of mixing the first non-laurin-based oil-and-fat with a non-laurin-based transesterification oil described below so as to obtain a fractionation oil-and-fat material (an oil-and-fat A), and a low trans-fatty acid content oil-and-fat excellent in functionality can be obtained in a soft portion obtained by fractionating the fractionation oil-and-fat material.

A hardening (hydrogenating) method is not particularly limited, and usual methods can be used. Hydrogenation can be carried out, for example, under the condition that under a nickel catalyst, at a hydrogen pressure of 0.02 to 0.3 MPa, and at a temperature of 120 to 200 degrees C.

(Non-laurin-based Transesterification Oil)

A non-laurin-based transesterification oil used in the preferred embodiment of the invention has an iodine value of 8 to 55, and contains 12 to 38 mass % of SSU type triglyceride. The iodine value is preferably 10 to 50, more preferably 12 to 45 and furthermore preferably 15 to 35. And, a SSU type triglyceride content is preferably 14 to 34 mass % and more preferably 16 to 30 mass %. Further, a SUS content of the non-laurin-based transesterification oil is less than 50 mass %, preferably less than 20 mass %.

If the iodine value and the SSU type triglyceride content of the non-laurin-based transesterification oil are kept within the above-mentioned range, the SSU type triglyceride content can be easily adjusted, in case of mixing the non-laurin-based transesterification oil with the first non-laurin-based oil-and-fat described above so as to obtain the fractionation oil-and-fat material (the oil-and-fat A)

Further, an analysis of the SUS type triglyceride and the SSU type triglyceride can be carried out by that, for example, after a S2U (SUS+SSU) type triglyceride content in the oil-and-fat is measured according to JAOCS. Vol. 70, 11, 1111-1114 (1993), a SUS/SSU ratio is measured by a method according to J. High Resol. Chromatogr., 18, 105-107 (1995).

In the preferred embodiment of the invention, an oil-and-fat material of the non-laurin-based transesterification oil is not particularly limited, and an oil-and-fat similar to the first non-laurin-based oil-and-fat can be used, if it contains not less than 90 mass % (preferably not less than 95 mass %, more preferably not less than 98 mass %) of fatty acids having carbon atoms of not less than 16 of the constituent fatty acids and has an iodine value which satisfies the iodine value of the non-laurin-based transesterification oil, in particular, it includes a palm-based oil-and-fat having the iodine value of 10 to 50; a mixture oil of an extremely hardened oil of an oil-and-fat containing not less than 90 mass % of fatty acids having carbon atoms of not less than 16 of the constituent fatty acids and an oil-and-fat containing not less than 50 mass % of oleic acid whose mixing ratio is 60:40 to 90:10 or a mixture oil of the above-mentioned extremely hardened oil and a palm-based oil-and-fat having the iodine value of 20 to 70 whose mixing ratio is 30:70 to 80:20; or the like.

More particularly, as the palm-based oil-and-fat described above, any one can be used, if it is a palm oil and a fractionated oil of palm oil. In particular, it includes (1) a palm olein and a palm stearin which are a first stage fractionated oil of palm oil, (2) a palm olein (a palm super olein) and a palm mid fraction which are a second stage fractionated oil obtained by that the palm olein is fractionated, and (3) a palm olein (a soft palm) and a palm stearin (a hard stearin) which are a second stage fractionated oil obtained by that the palm stearin is fractionated, and the like. One or more than two selected from the oil-and-fats described above can be used as an oil-and-fat material of the non-laurin-based transesterification oil either alone or in combination. Furthermore particularly, a transesterification oil having the iodine value of 12 to 45 (preferably 20 to 35) of the palm stearin or a mixture oil of the palm stearin and the other palm-based oil-and-fats is preferable.

Extremely hardened oil of an oil-and-fat containing not less than 90 mass % of fatty acids having carbon atoms of not less than 16 of the constituent fatty acids includes an extremely hardened oil of a soybean oil, a canola oil, a cotton seed oil, a sunflower oil, a safflower oil, a corn oil, a palm oil, a beef fat, a lard, a fish oil and the like, and the oil-and-fat having an oleic acid content of not less than 50 mass % includes a canola oil, a high oleic acid canola oil, a high oleic acid soybean oil, a high oleic acid sunflower oil, a high oleic acid safflower oil, a palm olein, a shea butter olein, a sal butter olein and the like. The palm-based oil-and-fat is as described above. An oil-and-fat material of the non-laurin-based transesterification oil can be prepared by appropriately selecting two or not less than three of the above. In particular, it includes an oil-and-fat obtained by transesterificating a mixture oil of an extremely hardened oil of the palm-based oil-and-fat and a canola oil having an oleic acid content of not less than 50 mass % whose mixing ratio is 60:40 to 90:10, an oil-and-fat obtained by transesterificating a mixture oil of an extremely hardened canola oil and a palm-based oil-and-fat having a iodine value of 20 to 70 whose mixing ratio is 30:70 to 80:20, and the like.

Further, it is preferable that the extremely hardened oil has the iodine value of not more than 2.

The method of transesterification is not particularly limited, and usual methods, particularly, any one of a chemical transesterification and an enzymatic transesterification can be used, the chemical transesterification using a synthesis catalyst such as sodium methoxide and the enzymatic transesterification using lipase as a catalyst.

As the enzymatic transesterification, a transesterification having a low specificity at positions can be preferably used. A lipase formulation which can realize the transesterification having a low specificity at positions includes a lipase derived from *Alcaligenes* (for example, "lipase QLM", "lipase PL" etc. manufactured by Meito Sangyo Co., Ltd.) and a lipase derived from *Candida* (for example, "lipase OF" etc. manufactured by Meito Sangyo Co., Ltd.) and the like.

The chemical transesterification, for example, can be carried out according to the steps of drying oil-and-fat materials sufficiently, adding 0.1 to 1 mass % of sodium methoxide to the oil-and-fat materials, and reacting under reduced pressure, at 80 to 120 degrees C., for 0.5 to 1 hour while agitating.

The enzymatic transesterification, for example, can be carried out according to the steps of adding 0.02 to 10 mass %, preferably 0.04 to 5 mass % of a powdered lipase or an immobilized lipase to the oil-and-fat material, and reacting at 40 to 80 degrees C., preferably 40 to 70 degree C., for 0.5 to 48 hours, preferably 0.5 to 24 hours while agitating.

In the preferred embodiment of the invention, the non-laurin-based transesterification oil can be partially hydrogenated in order to reform a crystallinity of the oil-and-fat. In case of being partially hydrogenated, the non-laurin-based transesterification oil contains preferably 5 to 35 mass %, more preferably 10 to 30 mass % and furthermore preferably 15 to 25 mass % of trans-fatty acid.

If the trans-fatty acid content of the non-laurin-based transesterification oil is kept within the above-mentioned range, the trans-fatty acid content can be easily adjusted, in case of mixing the non-laurin-based transesterification oil with the first non-laurin-based oil-and-fat described above so as to obtain a fractionation oil-and-fat material (an oil-and-fat A), and a low trans-fatty acid content oil-and-fat excellent in functionality can be obtained in a soft portion obtained by fractionating the fractionation oil-and-fat material.

Further, a fatty acid composition and the trans-fatty acid content of the oil-and-fat can be analyzed, for example, according to AOCS Celf-96.

Furthermore, the partial hydrogenation can be carried out either before the transesterification or after the transesterification. Namely, the partial hydrogenation can be carried out to the oil-and-fat after the transesterification and can also be carried out to a transesterification oil-and-fat material before transesterification. It is more preferable that the non-laurin-based oil-and-fat partially hydrogenated is transesterificated, in terms of stabilizing a quality of the non-laurin-based transesterification oil obtained. A method of the partial hydrogenation can be carried out similarly to the method described above.

(Second Non-laurin-based Oil-and-fat)

In the preferred embodiment of the invention, a second non-laurin-based oil-and-fat can be contained as an optional ingredient other than the first non-laurin-based oil-and-fat and the non-laurin-based transesterification oil, if the fractionation oil-and-fat material is kept within a range satisfying a condition that it contains 25 to 70 mass % of SUS type triglyceride, 2 to 20 mass % of SSU type triglyceride, and 40 to 85 mass % of a total of SUS type triglyceride and SSU type triglyceride, and 4 to 30 mass % of SSS type triglyceride.

The second non-laurin-based oil-and-fat is an oil-and-fat which contains not less than 90 mass % of fatty acids having carbon atoms of not less than 16 of the constituent fatty acids and excludes the first non-laurin-based oil-and-fat and the non-laurin-based transesterification oil.

Particularly, it includes a soybean oil, a high oleic acid soybean oil, a canola oil, a high oleic acid canola oil, a sunflower oil, a high oleic acid sunflower oil, a safflower oil, a high oleic acid safflower oil, a cotton seed oil, a corn oil, a palm oil, a palm olein, a palm stearin, a beef fat, a lard, a fish oil, a shea butter olein, a sal butter olein, a cacao butter alien, and hardened oils thereof (including extremely hardened oils thereof).

The second non-laurin-based oil-and-fat content in the fractionation oil-and-fat material is preferably 0 to 30 mass %, more preferably 0 to 20 mass %, furthermore preferably 0 to 10 mass %.

(Mixing Process of Obtaining Fractionation Oil-and-fat Material (Oil-and-fat A))

In the preferred embodiment of the invention, a method of obtaining the fractionation oil-and-fat material (oil-and-fat A) by mixing the first non-laurin-based oil-and-fat and the non-laurin-based transesterification oil is not particularly limited, however, a mixing ratio (mass ratio) of the first non-laurin-based oil-and-fat and the non-laurin-based transesterification oil is preferably 40:60 to 95:5, more preferably 45:55 to 90:10, furthermore preferably 50:50 to 85:15. A total content of the first non-laurin-based oil-and-fat and the non-laurin-based transesterification oil in the fractionation oil-and-fat material (oil-and-fat A) is preferably not less than 70 mass %, more preferably not less than 80 mass %, furthermore preferably not less than 90 mass %. It is preferable that the mixing work is carried out in a state that the oil-and-fat is perfectly molten.

(Process of Obtaining Fractionation Oil-and-fat Material (Oil-and-fat B))

It is preferable that the fractionation oil-and-fat material is an oil-and-fat B which is obtained by partially hydrogenating the above-mentioned oil-and-fat A obtained by mixing the first non-laurin-based oil-and-fat and the non-laurin-based transesterification oil. In this case, it is preferable that oil-and-fats being not partially hydrogenated are used as both of the first non-laurin-based oil-and-fat and the non-laurin-based transesterification oil, however, oil-and-fats being partially hydrogenated can be used as one or both of the first non-laurin-based oil-and-fat and the non-laurin-based transesterification oil.

(Specific Examples of Fractionation Oil-and-fat Material (Oil-and-fats A, B))

The specific example of the fractionation oil-and-fat materials (oil-and-fats A, B) includes the first non-laurin-based oil-and-fat and the non-laurin-based transesterification oil partially hydrogenated, the first non-laurin-based oil-and-fat partially hydrogenated and the non-laurin-based transesterification oil, and the first non-laurin-based oil-and-fat partially hydrogenated and the non-laurin-based transesterification oil partially hydrogenated, above all, the first non-laurin-based oil-and-fat and the non-laurin-based transesterification oil partially hydrogenated are preferable, especially, it is more preferable that the non-laurin-based transesterification oil partially hydrogenated is a transesterification oil obtained by being transesterificated after partially hydrogenated.

Combination of the more specific and preferable example includes a palm medium-melting fraction partially hydrogenated (iodine value: 30 to 45) and a palm stearin transesterification oil (iodine value: 15 to 35), the palm medium-melting fraction (iodine value: 30 to 45) and a transesterification oil of a palm stearin partially hydrogenated (iodine value: 15 to 35), and a partially hydrogenated mixture oil of the palm medium-melting fraction (iodine value: 30 to 45) and the palm stearin transesterification oil (iodine value: 15 to 35), and each of the mixing ratios of the combination is preferably 45:55 to 90:10. Above all, the palm medium-melting fraction (iodine value: 30 to 45) and a transesterification oil of a palm stearin partially hydrogenated (iodine value: 15 to 35) is preferable, especially, it is more preferable that the transesterification oil of the palm stearin partially hydrogenated (iodine value: 15 to 35) is a transesterification oil obtained by being transesterificated after partially hydrogenated.

(Process of Fractionating Fractionation Oil-and-fat Material)

A fractionating method in the process of obtaining the soft portion by fractionating the above-mentioned fractionation oil-and-fat material is not particularly limited. For example, it can be carried out by a dry fractionation, an emulsification fractionation, a solvent fractionation or the like can be used, and above all, the dry fractionation can realize an economical fractionation. The dry fractionation can be generally carried out by cooling the fractionation oil-and-fat material while agitating in a bath so as to deposit a crystal, and compressing and/or filtering so as to obtain a hard portion (crystal fraction) and a soft portion (liquid fraction). Although a fractionation temperature may vary in accordance with the property of fractionated oil-and-fat being required, it can be carried out at from 33 to 45 degrees C. In case of obtaining a general hard butter in the soft portion, it is appropriate that the fractionation temperature is 35 to 43 degrees C.

By passing through the above-mentioned processes, the soft portion can be obtained.

(Soft Portion)

The soft portion obtained has an iodine value of 25 to 50, a melting point of 25 to 45 degrees C., a fatty acid having carbon atoms of not less than 16 content of not less than 95 mass %, a trans-fatty acid content of not more than 22 mass % and a lauric ac id content of less than 5 mass %. It is preferable that the iodine value is 30 to 45, the melting point is 30 to 40 degrees C., the fatty acid having carbon atoms of not less than 16 content is not less than 98 mass %, the trans-fatty acid content is not more than 15 mass % and the lauric acid content is less than 2 mass %.

Further, the soft portion according to the embodiment, in case of being a widely-used hard butter, has a solid fat content (SFC) at 25 degrees C. of preferably 40 to 70%, more preferably 45 to 70%, and furthermore preferably 50 to 70%, has the SFC at 30 degrees C. of preferably 20 to 50%, more preferably 23 to 50%, and furthermore preferably 25 to 50%, and has the SFC at 35 degrees C. of preferably 5 to 25%, more preferably 5 to 20%, and furthermore preferably 5 to 16%.

The value of SFC can be measured according to IUPAC method 2.150a Solid Content determination in Fats by NMR.

The soft portion can be used as an oil-and-fat of a cacao butter substitute, that is, a non-tempering hard butter. The soft portion (non-tempering hard butter) can be used for chocolates and an oil-based food product such as a cream, a filling, a coating and the like, and the soft portion can be contained in the oil-and-fat of the oil-based food product by 5 to 100 mass %.

(Advantages of embodiment according to the invention)

According to the embodiment of the invention, the following advantages can be provided.

(1) A non-tempering hard butter can be provided, which is a non-lauric acid type, and has a sharp melting property (meltability in the mouth), a good compatibility with cacao butter, and a significantly lower trans-fatty acid content in comparison with the usual trans-fatty acid type hard butter (trans-fatty acid content: 35 to 55 mass %).

(2) The non-tempering hard butter according to the embodiment has an extremely low lauric acid content, so that a low compatibility with a cacao butter that is an inherent defect of the cacao butter substitutes being rich in lauric acid can be improved, and a chocolate being rich in cacao flavor can be realized, and occurrence of a soapy odor (an unpleasant odor which occurs when the oil-and-fat is hydrolyzed for some reasons so as to produce free fatty acids) that is an inherent defect of the cacao butter substitutes being rich in lauric acid can be prevented.

(3) A desired soft portion can be obtained by typically one process of the dry fractionation, without using the solvent fractionation that needs a high cost of production due to complex operation and large-scale facilities, so that the above-mentioned non-tempering hard butter can be easily and economically produced in the extreme.

Hereinafter, the invention will be described according to examples, however, the invention is not to be limited to any of these Examples.

EXAMPLES (Method of Analysis)

The fatty acid composition and the trans-fatty acid content were analyzed according to AOCS Celf-96.

The S2U (SUS+SSU) type triglyceride and the SSS type triglyceride were analyzed according to JAOCS. Vol. 70, 11, 1111-1114 (1993).

The SUS type triglyceride and the SSU type triglyceride were analyzed by measuring the SUS/SSU ratio by a method according to J. High Resol. Chromatogr., 18, 105-107 (1995), based on the S2U type triglyceride content.

Here, S is saturated fatty acids having carbon atoms of 16 to 22 and U is unsaturated fatty acids having carbon atoms of 16 to 22. Hereinafter, the triglyceride is occasionally abbreviated as TG.

Further, the SFC was measured according to IUPAC method 2.150a Solid Content determination in Fats by NMR.

(Production of Soft Portion)

Soft portions of Examples A to I were produced by obtaining mixture oils which use first non-laurin-based oil-and-fats (SY1 to SY5) described below, non-laurin-based transesterification oils (IE1 to IE4) and a second non-laurin-based oil-and-fats (HPS) as the fractionation oil-and-fat materials (oil-and-fats A, B).

As the first non-laurin-based oil-and-fat, the following oil-and-fats were used.

SY1: palm medium-melting fraction (iodine value: 32.5, SUS type TG: 85.2 mass %, SSU type TG: 6.4 mass %, SSS type TG: 2.4 mass %, fatty acids having carbon atoms of not less than 16: 99.0 mass %, trans-fatty acid: 0.0 mass %, manufactured by Malaysia ISP)

SY2: palm medium-melting fraction (iodine value: 36.8, SUS type TG: 75.0 mass %, SSU type TG: 7.4 mass %, SSS type TG: 3.0 mass %, fatty acids having carbon atoms of not less than 16: 98.7 mass %, trans-fatty acid: 0.0 mass %, manufactured by Malaysia ISF)

SY3: palm medium-melting fraction (iodine value: 40.6, SUS type TG: 70.4 mass %, SSU type TG: 7.0 mass %, SSS type TG: 2.3 mass %, fatty acids having carbon atoms of not less than 16: 98.7 mass %, trans-fatty acid: 0.0 mass %, manufactured by Malaysia ISF)

SY4: partially hydrogenated palm medium-melting fraction (iodine value: 38.2, SUS type TG: 65.4 mass %, SSU type TG: 8.1 mass %, SSS type TG: 3.1 mass %, fatty acids having carbon atoms of not less than 16: 98.8 mass %, trans-fatty acid: 10.0 mass %, manufactured by Malaysia ISF)

SY5: partially hydrogenated palm medium-melting fraction (iodine value: 40.6, SUS type TG: 58.3 mass %, SSU type TG: 8.0 mass %, SSS type TG: 2.0 mass %, fatty acids having carbon atoms of not less than 16: 98.9 mass %, trans-fatty acid: 23.6 mass %, manufactured by Malaysia ISF)

As the non-laurin-based transesterification oil, the following transesterification oils were used. The transesterification was carried out in accordance with the common procedures of drying the oil-and-fat materials sufficiently, adding 0.2 mass % of sodium methoxide to the oil-and-fat materials, and reacting under reduced pressure, at 80 to 120 degrees C., for 0.5 to 1 hour while agitating.

IE1: transesterification oil of palm stearin (iodine value: 15.7, SUS type TG: 9.8 mass %, SSU type TG: 19.3 mass %, SSS type TG: 61.3 mass %, fatty acids having carbon atoms of not less than 16: 98.8 mass %, trans-fatty acid: 0.0 mass %)

IE2: transesterification oil of palm stearin (iodine value: 22.9, SUS type TG: 11.8 mass %, SSU type TG: 23.6 mass %, SSS type TG: 48.4 mass %, fatty acids having carbon atoms of not less than 16: 98.6 mass %, trans-fatty acid: 0.0 mass %)

IE3: transesterification oil of partially hydrogenated palm stearin (iodine value: 31.2, SUS type TG: 13.1 mass %, SSU type TG: 26.5 mass %, SSS type TG: 29.2 mass %, fatty acids having carbon atoms of not less than 16: 98.7 mass %, trans-fatty acid: 21.2 mass %)

IE4: transesterification oil of mixture oil of 60 parts of palm stearin (iodine value: 30) and 40 parts of extremely hardened canola oil (iodine value: 1) (iodine value: 18.4, SUS type TG: 11.5 mass %, SSU type TG: 23.1 mass %, SSS type TG: 53.9 mass %, fatty acids having carbon atoms of not less than 16: 99.0 mass %, trans-fatty acid: 0.0 mass %)

As the second non-laurin-based oil-and-fat, the following oil-and-fat was used.

HPS: extremely hardened oil of palm stearin (iodine value: 0.5, SUS type TG: 0.0 mass %, SSU type TG: 0.0 mass %, SSS type TG: 95.1 mass %, fatty acids having carbon atoms of not less than 16: 98.8 mass %, trans-fatty acid: 0.0 mass %, manufactured by Malaysia ISF)

Example A

First, 60 mass % of SY1 as the first non-laurin-based oil-and-fat and 40 mass % of IE3 as the non-laurin-based transesterification oil were perfectly molten and mixed, and a mixture oil (melting point: 43 degrees C., iodine value: 31.9, SUS type TG: 58.0 mass %, SSU type TG: 14.5 mass %, SSS type TG: 12.5 mass %, trans-fatty acid: 8.6 mass %) was obtained.

Next, the mixture oil was dry-fractionated at 38 to 41 degrees C., and a fractionated soft portion A was obtained in yield of 82%.

Example B

First, 49 mass % of SY1 as the first non-laurin-based oil-and-fat, 49 mass % of IE3 as the non-laurin-based transesterification oil, and 2 mass % of HPS as the second non-laurin-based oil-and-fat were perfectly molten and mixed, and a mixture oil (melting point: 45 degrees C., iodine value: 31.0, SUS type TG: 48.0 mass %, SSU type TG: 16.0 mass %, SSS type TG: 16.9 mass %, trans-fatty acid: 10.6 mass %) was obtained.

Next, the mixture oil was dry-fractionated at 38 to 41 degrees C., and a fractionated soft portion B was obtained in yield of 73%.

Example C

First, 80 mass % of SY4 as the first non-laurin-based oil-and-fat and 20 mass % of IE1 as the non-laurin-based transesterification oil were perfectly molten and mixed, and a mixture oil (melting point: 45 degrees C., iodine value: 33.2, SUS type TG: 54.6 mass %, SSU type TG: 10.0 mass %, SSS type TG: 14.6 mass %, trans-fatty acid: 8.0 mass %) was obtained.

Next, the mixture oil was dry-fractionated at 38 to 41 degrees C., and a fractionated soft portion C was obtained in yield of 70%.

Example D

First, 50 mass % of SY5 as the first non-laurin-based oil-and-fat and 50 mass % of IE2 as the non-laurin-based transesterification oil were perfectly molten and mixed, and a mixture oil (melting point: 48 degrees C., iodine value: 31.5, SUS type TG: 35.1 mass %, SSU type TG: 15.8 mass %, SSS type TG: 24.8 mass %, trans-fatty acid: 11.8 mass %) was obtained.

Next, the mixture oil was dry-fractionated at 38 to 41 degrees C., and a fractionated soft portion D was obtained in yield of 54%.

Example E

First, 90 mass % of SY3 as the first non-laurin-based oil-and-fat and 10 mass % of IE1 as the non-laurin-based transesterification oil were perfectly molten and mixed, and a mixture oil (melting point: 36 degrees C., iodine value: 37.9) was obtained.

Next, the mixture oil was hydrogenated by using a nickel catalyst, and a partially hydrogenated oil (melting point: 44 degrees C., iodine value: 35.9, SUS type TG: 61.5 mass %, SSU type TG: 6.8 mass %, SSS type TG: 8.8 mass %, trans-fatty acid: 11.9 mass %) was obtained. The partially hydrogenated oil was dry-fractionated at 38 to 41 degrees C., and a fractionated soft portion E was obtained in yield of 71%.

Example F

First, 80 mass % of SY2 as the first non-laurin-based oil-and-fat and 20 mass % of IE1 as the non-laurin-based transesterification oil were perfectly molten and mixed, and a mixture oil (melting point: 42 degrees C., iodine value: 32.6) was obtained.

Next, the mixture oil was hydrogenated by using a nickel catalyst, and a partially hydrogenated oil (melting point: 45 degrees C., iodine value: 30.8, SUS type TG: 59.5 mass %, SSU type TG: 9.7 mass %, SSS type TG: 14.6 mass %, trans-fatty acid: 10.4 mass %) was obtained. The partially hydrogenated oil was dry-fractionated at 38 to 41 degrees C., and a fractionated soft portion F was obtained in yield of 65%.

Example G

First, 70 mass % of SY3 as the first non-laurin-based oil-and-fat and 30 mass % of IE2 as the non-laurin-based transesterification oil were perfectly molten and mixed, and a mixture oil (melting point: 43 degrees C., iodine value: 35.3) was obtained.

Next, the mixture oil was hydrogenated by using a nickel catalyst, and a partially hydrogenated oil (melting point: 46 degrees C., iodine value: 32.4, SUS type TG: 50.5 mass %, SSU type TG: 11.1 mass %, SSS type TG: 16.2 mass trans-fatty acid: 13.2 mass %) was obtained. The partially hydrogenated oil was dry-fractionated at 38 to 41 degrees C., and a fractionated soft portion G was obtained in yield of 59%.

Example H

First, 50 mass % of SY3 as the first non-laurin-based oil-and-fat and 50 mass % of IE2 as the non-laurin-based transesterification oil were perfectly molten and mixed, and a mixture oil (melting point: 51 degrees C., iodine value: 32.0) was obtained.

Next, the mixture oil was hydrogenated by using a nickel catalyst, and a partially hydrogenated oil (melting point: 50 degrees C., iodine value: 30.2, SUS type TG: 39.2 mass %, SSU type TG: 14.5 mass %, SSS type TG: 25.0 mass %, trans-fatty acid: 6.8 mass %) was obtained. The partially hydrogenated oil was dry-fractionated at 38 to 41 degrees C., and a fractionated soft portion H was obtained in yield of 65%.

Example I

First, 65 mass % of SY1 as the first non-laurin-based oil-and-fat and 35 mass % of IE4 as the non-laurin-based transesterification oil were perfectly molten and mixed, and a mixture oil (melting point: 47 degrees C., iodine value: 26.3, SUS type TG: 56.5 mass %, SSU type TG: 13.1 mass %, SSS type TG: 22.4 mass %, trans-fatty acid: 0.0 mass %) was obtained.

Next, the mixture oil was dry-fractionated at 38 to 41 degrees C., and a fractionated soft portion I was obtained in yield of 70%.

A Reference Example 1 is an example of a hard butter of a typical high trans-fatty acid type, and a Reference Example 2 is an example of a hard butter of a typical lauric acid type.

With regard to the soft portions obtained in Examples A to I, an iodine value, a melting point, a fatty acid having carbon atoms of not less than 16 content and a trans-fatty acid content were measured and the measurement results are shown in Tables 1 to 3. Similarly, measurement results of a fatty acid composition, an iodine value, a melting point, a fatty acid having carbon atoms of not less than 16 content and a trans-fatty acid content of Reference Examples 1 to 2 are shown in Table 4. Furthermore, SEC was measured according to IUPAC method 2.150a Solid Content determination in Fats by NMR, and the measurement results are shown in Tables 1 to 4.

TABLE 1

Measurement results of Examples A to C

|  | Fractionated soft portion A | Fractionated soft portion B | Fractionated soft portion C |
|---|---|---|---|
| Iodine value | 34.4 | 35.9 | 38.6 |
| Melting point (degrees C.) | 36.2 | 35.5 | 35.7 |
| Fatty acids having carbon atoms of not less than 16 (mass %) | 99.1 | 99.0 | 98.8 |
| Trans-fatty acid content (mass %) | 8.8 | 11.1 | 7.3 |
| SFC (%) | | | |
| 10 degrees C. | 95.4 | 95.4 | 91.3 |
| 20 degrees C. | 86.1 | 83.4 | 72.8 |
| 25 degrees C. | 58.3 | 54.5 | 46.8 |
| 30 degrees C. | 28.1 | 25.8 | 22.1 |
| 35 degrees C. | 10.7 | 9.0 | 7.5 |
| 40 degrees C. | 0 | 0 | 0 |

TABLE 2

Measurement results of Examples D to F

|  | Fractionated soft portion D | Fractionated soft portion E | Fractionated soft portion F |
|---|---|---|---|
| Iodine value | 42.6 | 39.3 | 35.6 |
| Melting point (degrees C.) | 36.0 | 35.9 | 36.8 |
| Fatty acids having carbon atoms of not less than 16 (mass %) | 98.6 | 98.9 | 98.9 |
| Trans-fatty acid content (mass %) | 12.2 | 10.0 | 9.0 |
| SFC (%) | | | |
| 10 degrees C. | 88.1 | 94.5 | 95.9 |
| 20 degrees C. | 64.5 | 77.5 | 83.9 |
| 25 degrees C. | 41.6 | 54.2 | 61.5 |
| 30 degrees C. | 21.5 | 28.1 | 33.0 |
| 35 degrees C. | 7.8 | 10.8 | 13.5 |
| 40 degrees C. | 0 | 0 | 0 |

TABLE 3

Measurement results of Examples G to I

|  | Fractionated soft portion G | Fractionated soft portion H | Fractionated soft portion I |
|---|---|---|---|
| Iodine value | 39.5 | 37.5 | 31.9 |
| Melting point (degrees C.) | 34.4 | 38.8 | 35.0 |
| Fatty acids having carbon atoms of not less than 16 (mass %) | 98.8 | 98.7 | 99.0 |
| Trans-fatty acid content (mass %) | 11.9 | 7.2 | 0.0 |
| SFC (%) | | | |
| 10 degrees C. | 94.2 | 92.0 | 91.5 |
| 20 degrees C. | 74.9 | 73.0 | 70.2 |
| 25 degrees C. | 48.7 | 51.5 | 34.1 |
| 30 degrees C. | 23.6 | 29.8 | 13.5 |
| 35 degrees C. | 7.2 | 14.8 | 5.6 |
| 40 degrees C. | 0 | 3.1 | 0 |

TABLE 4

Measurement results of Reference Examples 1 to 2

|  | Reference Example 1 | Reference Example 2 |
|---|---|---|
| Iodine value | 53.7 | 0.3 |
| Melting point (degrees C.) | 36.5 | 34.2 |
| Fatty acids having carbon atoms of not less than 16 (mass %) | 98.5 | 18.5 (lauric acid 56 mass %) |
| Trans-fatty acid content (mass %) | 39.0 | 0.0 |
| SFC (%) | | |
| 10 degrees C. | 94.4 | 97.3 |
| 20 degrees C. | 77.4 | 96.0 |
| 25 degrees C. | 59.1 | 90.4 |
| 30 degrees C. | 34.9 | 48.5 |
| 35 degrees C. | 10.5 | 2.0 |
| 40 degrees C. | 0 | 0 |

From the measurement results shown in Tables 1 to 4, it is understood that the soft portions obtained in Examples A to I have a lower trans-fatty acid content than Reference Example 1. Further, from the measurement results (SFC values) shown in Tables 1 to 3, it is understood that the mixture oil soft portions obtained in Examples A to I have a good (sharp) melting property (meltability in the mouth) (Examples F, H have a good heat resistance, so that it is suitable for a coating purpose. Example I is suitable for a frozen-food purpose.).

(Evaluation Test of Meltability in the Mouth)

With regard to the fractionation soft portions A, C, F and the hard butter of Reference Example 1, non-tempering chocolates were experimentally produced according to the compounding ratio shown in Table 5 and non-tempering chocolates were tasted by five expert panelists, so that all the panelists evaluated that the chocolates using the fractionation soft portions A, C, F have a good meltability in the mouth, so as to be the same or more than the chocolate using the hard butter of Referential Example 1.

TABLE 5

| Chocolate composition (mass %) | |
|---|---|
| Cacao mass | 8.0 |
| Cacao powder | 4.0 |
| Powdered sugar | 57.6 |
| Test oil-and-fat | 30.0 |
| Lecithin | 0.4 |

(Evaluation Test of Compatibility with Cacao Butter)

With regard to the fractionation soft portions A, C, F and the hard butter of Reference Example 2, an evaluation test of compatibility with the cacao butter was carried out by calculating a compatibility grade according to the following formula, based on SFC values measured at the measurement temperatures and at the mixing ratios (hard butter/cacao butter) of hard butter and cacao butter of 95/5, 90/10 85/15 and 80/20. The evaluation results (measurement result) are shown in Tables 6 to 9. In this case, the higher the compatibility grade at the mixing ratios and measurement temperatures, the better the compatibility with the cacao butter.

compatibility grade (%)=(SFC actually measured at the mixing ratio and measurement temperature)/(weighted average SFC by the mixing ratio, based on hard butter SFC and cacao butter SFC actually measured at the measurement temperature)×100

TABLE 6

Fractionated soft portion A: Compatibility grade (mass %)

| | Mixing ratio (Fractionated soft portion A/Cacao butter) | | | |
|---|---|---|---|---|
| | 95/5 | 90/10 | 85/15 | 80/20 |
| 0 degrees C. | 100 | 100 | 100 | 100 |
| 5 degrees C. | 100 | 100 | 99 | 99 |
| 10 degrees C. | 100 | 100 | 99 | 98 |
| 15 degrees C. | 100 | 100 | 99 | 98 |
| 20 degrees C. | 100 | 99 | 99 | 97 |
| 25 degrees C. | 100 | 98 | 96 | 94 |
| 30 degrees C. | 100 | 95 | 90 | 87 |
| 35 degrees C. | 100 | 91 | 88 | 86 |

TABLE 7

Fractionated soft portion C: Compatibility grade (mass %)

| | Mixing ratio (Fractionated soft portion C/Cacao butter) | | | |
|---|---|---|---|---|
| | 95/5 | 90/10 | 85/15 | 80/20 |
| 0 degrees C. | 100 | 100 | 100 | 100 |
| 5 degrees C. | 100 | 100 | 99 | 99 |
| 10 degrees C. | 100 | 100 | 99 | 98 |
| 15 degrees C. | 100 | 100 | 99 | 98 |
| 20 degrees C. | 100 | 99 | 98 | 97 |
| 25 degrees C. | 98 | 96 | 94 | 90 |
| 30 degrees C. | 94 | 90 | 84 | 78 |
| 35 degrees C. | 89 | 82 | 72 | 65 |

TABLE 8

Fractionated soft portion F: Compatibility grade (mass %)

| | Mixing ratio (Fractionated soft portion F/Cacao butter) | | | |
|---|---|---|---|---|
| | 95/5 | 90/10 | 85/15 | 80/20 |
| 0 degrees C. | 100 | 100 | 100 | 100 |
| 5 degrees C. | 100 | 100 | 99 | 99 |
| 10 degrees C. | 100 | 100 | 99 | 98 |
| 15 degrees C. | 100 | 100 | 99 | 98 |
| 20 degrees C. | 100 | 99 | 99 | 97 |
| 25 degrees C. | 100 | 98 | 96 | 93 |
| 30 degrees C. | 95 | 93 | 89 | 83 |
| 35 degrees C. | 92 | 87 | 77 | 71 |

TABLE 9

Hard butter of Reference Example 2: Compatibility grade (mass %)

| | Mixing ratio (Hard butter of Reference Example 2/Cacao butter) | | | |
|---|---|---|---|---|
| | 95/5 | 90/10 | 85/15 | 80/20 |
| 0 degrees C. | 100 | 100 | 100 | 100 |
| 5 degrees C. | 100 | 100 | 100 | 100 |
| 10 degrees C. | 100 | 100 | 100 | 100 |
| 15 degrees C. | 100 | 100 | 100 | 100 |
| 20 degrees C. | 100 | 100 | 100 | 97 |
| 25 degrees C. | 96 | 91 | 86 | 81 |
| 30 degrees C. | 85 | 72 | 62 | 51 |
| 35 degrees C. | 84 | 39 | 29 | 13 |

From the Tables 6 to 9, it is understood that the fractionation soft portions A, C, F have a better compatibility with the cacao butter (the compatibility is good at 30 to 35 degrees C. so that the heat resistance is not likely to be lowered) than the hard butter of Referential Example 2.

What is claimed is:

1. A method of making an oil-and-fat, comprising:
    fractionating one of:
        an oil-and-fat A comprising a first non-laurin-based oil-and-fat including 55 mass % to 100 mass % of SUS triglyceride and a non-laurin-based transesterification oil including 14 mass % to 34 mass % of SSU triglyceride; and
        an oil-and-fat B obtained by partially hydrogenating the oil-and-fat A so as to obtain a soft portion,
    wherein the oil-and-fat A and the oil-and-fat B have an iodine value of 10 to 60.

2. The method of making an oil-and-fat according to claim 1, wherein:
    the first non-laurin-based oil-and-fat includes 5 mass % to 35 mass % of the trans-fatty acid.

3. The method of making an oil-and-fat according to claim 1, wherein:
    the non-laurin-based transesterification oil includes 5 mass % to 35 mass % of the trans-fatty acid.

4. The method of making an oil-and-fat according to claim 1, wherein:
    the non-laurin-based transesterification oil comprises an oil-and-fat obtained by transesterificating a non-laurin-based oil-and-fat being partially hydrogenated.

5. The method of making an oil-and-fat according to claim 1, wherein:
    the first non-laurin-based oil-and-fat comprises a palm-based oil-and-fat having the iodine value of 20 to 55.

6. The method of making an oil-and-fat according to claim 5, wherein:
    the palm-based oil-and-fat comprises a palm oil and/or a fractionated palm oil.

7. The method of making an oil-and-fat according to claim 1, wherein:
    the oil-and-fat A has a content ratio (mass ratio) of the first non-laurin-based oil-and-fat and the non-laurin-based transesterification oil that is 40:60 to 95:5.

8. The method of making an oil-and-fat according to claim 1, wherein the oil-and-fat A further includes a second non-laurin-based oil-and-fat which is other than the first non-laurin-based oil-and-fat.

9. A soft portion obtained by the method of making an oil-and-fat according to claim 1.

10. An oil-based food product manufactured by using the soft portion according to claim 9.

11. The method of making an oil-and-fat according to claim 1, wherein the first non-laurin-based oil-and-fat includes 55 mass % to 95 mass % of SUS triglyceride.

12. A method of making an oil-and-fat, comprising:
mixing a first non-laurin-based oil-and-fat including 55 mass % to 100 mass % of SUS triglyceride and a non-laurin-based transesterification oil including 14 mass % to 34 mass % of SSU triglyceride to obtain an oil-and-fat A; and
fractionating the oil-and-fat A so as to obtain a soft portion,
wherein the oil-and-fat A has an iodine value of 10 to 60.

13. The method of making an oil-and-fat according to claim 12, wherein the fractionating of the oil-and-fat A comprises one of a dry fractionation, an emulsification fractionation, and a solvent fractionation.

14. The method of making an oil-and-fat according to claim 12, wherein the fractionating of the oil-and-fit A comprises a dry fractionation comprising:
cooling the oil-and-fat A while agitating the oil-and-fat A in a bath so as to deposit a crystal; and
one of compressing and filtering the oil-and-fat A so as to obtain a hard portion comprising a crystal fraction, and the soft portion Comprising a liquid fraction.

15. The method of making an oil-and-fat according to claim 12, wherein the mixing of the first non-laurin-based oil-and-fat and the non-laurin-based transesterification oil comprises molten and mixing of the first non-laurin-based oil-and-fat and the non-laurin-based transesterification oil.

16. A method of making an oil-and-fat, comprising:
mixing a first non-laurin-based oil-and-fat including 55 mass % to 100 mass % of SUS triglyceride and a non-laurin-based transesterification oil including 14 mass % to 34 mass % of SSU triglyceride to obtain an oil-and-fat A;
partially hydrogenating the oil-and-fat A to obtain an oil-and-fat B; and
fractionating the oil-and-fat B so as to obtain a soft portion,
wherein the oil-and-fat A and the oil-and-fat B have an iodine value of 10 to 60.

17. The method of making an oil-and-fat according to claim 16, wherein the partially hydrogenating of the oil-and-fat A is performed under a nickel catalyst, at a hydrogen pressure in a range from 0.02 MPa to 0.3 MPa, and at a temperature in a range from 120° C. to 200° C.

18. The method of making an oil-and-fat according to claim 1, wherein the non-laurin-based transesterification oil includes 14 mass % to 30 mass % of SSU triglyceride.

19. The method of making an oil-and-fat according to claim 12, wherein the oil-and-fat A includes 25 mass % to 70 mass % of the SUS triglyceride, 2 mass % to 20 mass % of the SSU triglyceride and 40 mass % to 85 mass % of a total of the SUS triglyceride and the SSU triglyceride, and further includes 4 mass % to 30 mass % of SSS triglyceride.

20. The method of making an oil-and-fat according to claim 16, wherein the oil-and-fat B includes 25 mass % to 70 mass % of the SUS triglyceride, 2 mass % to 20 mass % of the SSU triglyceride and 40 mass % to 85 mass % of a total of the SUS triglyceride and the SSU triglyceride, and farther includes 4 mass % to 30 mass % of SSS triglyceride.

* * * * *